R. McCUTCHEON.
Churn.
No. 17,439.
Patented June 2, 1857.
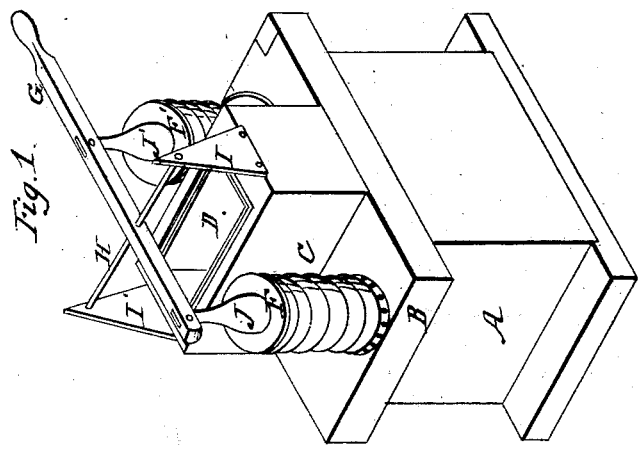
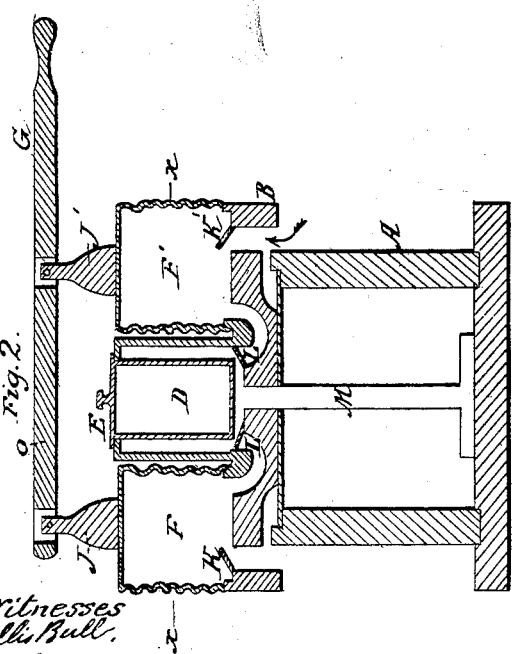
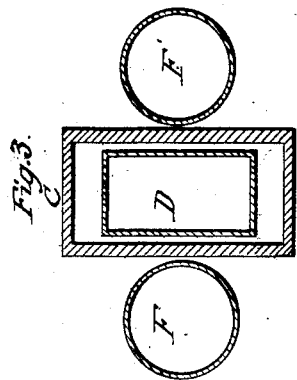

UNITED STATES PATENT OFFICE.

ROBERT McCUTCHEON, OF TOWANDA, PENNSYLVANIA.

ATMOSPHERIC CHURN.

Specification of Letters Patent No. 17,439, dated June 2, 1857.

*To all whom it may concern:*

Be it known that I, ROBERT MCCUTCHEON, of Towanda, in the county of Bradford and State of Pennsylvania, have invented a new and useful Arrangement for Atmospheric Churns; and I do hereby declare that the following is a full, and exact description thereof, reference being had to the accompanying drawings and to the letters of reference marked thereon.

Figure 1 in the accompanying drawings is an isometrical view of my improved churn. Fig. 2 a vertical section through the center of Fig. 1 longitudinally, and Fig. 3 a transverse section through the line $x\ x$ Fig. 2.

A is the body of the churn, in which the material is placed from which to produce the butter. B the cover to the body, made detachable from it, and fastened to it, when in use, by hooks or other fastenings. C a reservoir, made of wood, for its non-conduction of heat, secured by an air-tight joint to the top of the cover B. D an interior reservoir, secured at the top tightly to the top of the reservoir C, made of tin-plate or other good metallic conductor of heat, of sufficiently less size than the reservoir C to permit a free and ready circulation of air from the bellows to its exterior surface. It is designed to be filled with cold or warm water, according to the state of the weather at the time the churn is used, to keep the air conveyed to the body of the churn at the requisite temperature. E cover to the interior reservoir, by the removal of which it can be filled and by replacing it the contents of the reservoir are kept from the influence of, or being affected by, the external air. F F' a pair of bellows, made of leather or other pliant material to permit them to be operated up and down without material wear. The material is secured at the bottom to the top of the cover B, and at the top to a wooden head to keep it properly extended. They are operated by the lever G (vibrating on the shaft H in the support I I') and the connecting rods J, J'. K, K', inlet, and L, L, outlet valves to the bellows. M air-pipe from the interior reservoir, running down to the bottom of the body of the churn, where it branches off with two or more lateral branches to disseminate the air throughout the material in the churn.

The operation of the churn is as follows: After filling the body of it with milk or cream and replacing the top in position, the interior reservoir D is filled with either cold or warm water, according as the external air is above or below the proper temperature at which the milk or cream is easiest and best converted into butter, the bellows are then operated by working the lever G up and down, forcing the current of air created by them first through the reservoir C, where it is cooled or heated as needed, by coming in contact with the cooled or heated surface of the interior reservoir, and from thence through the air-pipe M, which distributes it through the milk or cream in the body of the churn and produces the butter, by continuing the operation, by the mechanical separation of the oily from the serous part of the milk or cream by the agitation produced by its passage through it.

I do not claim using atmospheric air in a churn to produce butter by the mechanical disturbance of the cohesion of the oily and serous parts of milk or cream by agitation, as that is known and used, but

What I claim as my invention, and desire to secure by Letters Patent is—

The bellows F, F', the chambers C and D, and the air-pipe M, when arranged in relation to each other and to the body of the churn in the manner and for the purposes herein set forth.

R. McCUTCHEON.

Witnesses:
 WALLIS BULL,
 GEO. BULL.